United States Patent Office 3,451,275
Patented June 24, 1969

3,451,275
SELF-MONITORED GYRO-SYSTEM
Roy Atkin, Lewisham, England, assignor to Elliott Brothers (London) Limited, London, England, a British company
Filed June 14, 1967, Ser. No. 645,960
Claims priority, application Great Britain, June 17, 1966, 27,234/66
Int. Cl. G01c 19/02
U.S. Cl. 74—5.34                                    5 Claims

ABSTRACT OF THE DISCLOSURE

A monitored gyroscope system having a main and a monitoring gyrowheel each mounted in its own inner gimbal and a common outer gimbal. Each wheel can give a signal when its inner gimbal pivots abouts its own axis but movement of either inner gimbal about the pivotal axis of the common outer gimbal will be communicated to the other inner gimbal. In a refinement each wheel has a first inner and a first outer gimbal servoed together and a second inner and a second and common outer gimbal, also servoed together. The two first outer gimbals are mechanically linked. Signals and servoing are done by synchros and servomotors.

Figure 1:
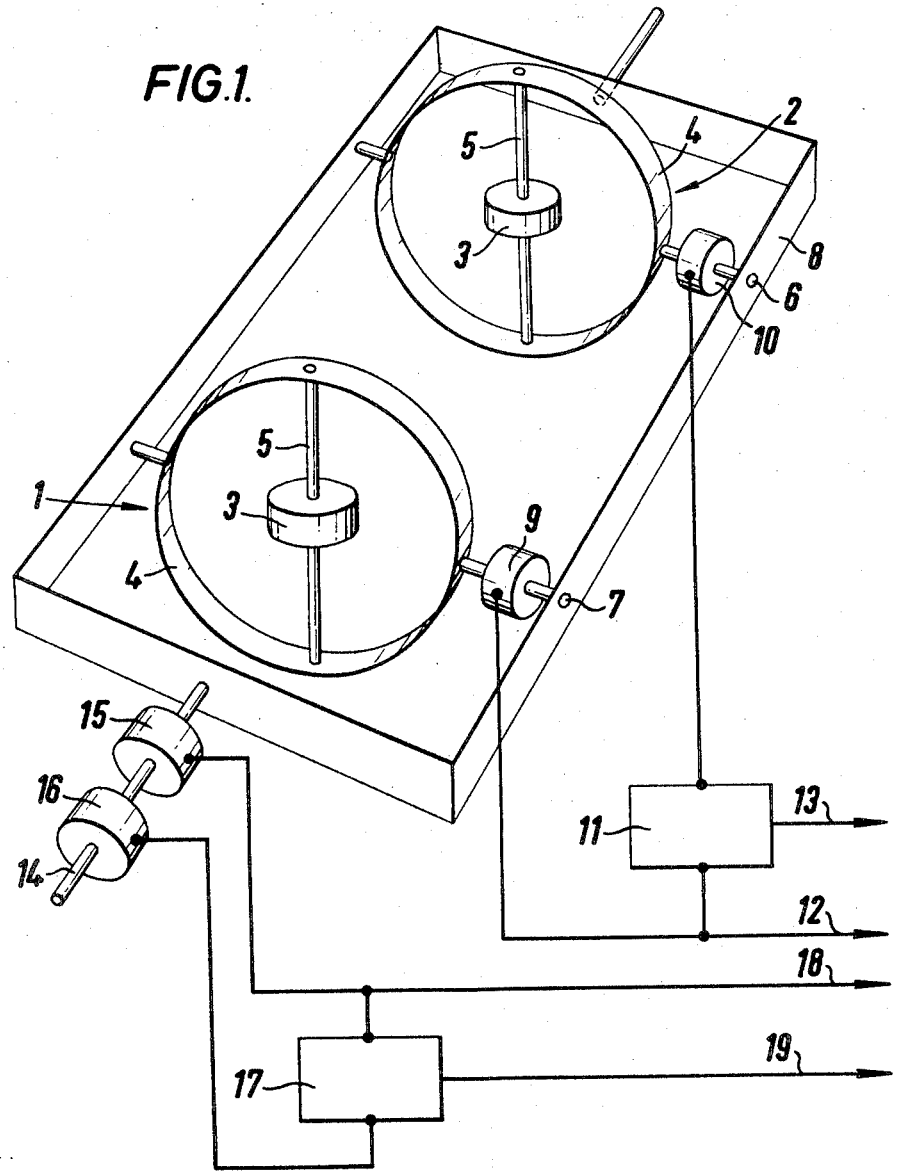

The invention comprises a gyroscopic system arranged as a self-monitored gyroscopic attitude reference system responsive to angular movements of a dirigible craft about a first and a second axis fixed with reference to said craft and at right-angles to one another, comprising a main gyrowheel and a monitoring gyrowheel, two individual inner gimbal rings in each of which is mounted for spinning one of said gyrowheels on a spinning axis normally at right-angles to both of said first and second axes, a common outer gimbal ring in which are pivotally mounted both of said individual inner gimbal rings for angular movement about one of said first and second axes, a pivotal mounting for angular movement of said common outer gimbal ring about the other of said first and second axes, means for generating output signals on the occurrence of an angular movement relative to said craft of said common outer gimbal ring, means for generating output signals on the occurrence of an angular movement relative to said craft of that inner gimbal ring in which spins said main gyrowheel, means for generating a monitoring signal of an angular movement relative to said craft of that inner gimbal ring in which spins said monitoring gyrowheel, means for measuring the difference between said signals generated by said angular movement of said inner gimbal ring of said main gyrowheel and said monitoring signal, and means for generating an alarm signal should said difference exceed a predetermined threshold value.

The invention also comprises a gyroscopic system arranged as a self-monitored gyroscopic attitude reference system responsive to angular movements of a dirigible craft about a first and a second axis fixed with reference to said craft and at right-angles to one another, comprising a main gyrowheel and a monitoring gyrowheel, two individual first inner gimbal rings in each of which is mounted for spinning one of said gyrowheels on a spinning axis normally at right-angles to both of said first and second axes and each having two individual first outer gimbal rings, the said first inner and the said first outer gimbal rings being pivotally mounted for angular movement about one of said first and second axes, two individual second inner gimbal rings, one for each of said gyrowheels and each pivotally mounted for angular movement about the other of said first and second axes, a common second outer gimbal ring in which is pivotally mounted each of said first outer gimbal rings for angular movement about the one of said first and second axes and a pivotal mounting for angular movement of said common second outer gimbal ring about the other of said first and second axes.

This invention relates to improvements in gyroscopic systems used either for giving visual indications to the pilot of a dirigible craft such as an aircraft or for the control of an automatic pilot, or for similar use.

According to the invention a gyroscopic system comprises at least two gyrowheels, each mounted for spinning in its own individual inner gimbal ring, the inner gimbal rings each being pivotally mounted on its own axis in a common outer gimbal ring which is itself pivotally mounted. Moreover, each gyrowheel is arranged so that it can give an individual signal on the occurrence of an angular movement about the pivotal axis of its own inner gimbal ring, whereas an angular movement of one inner gimbal ring about the pivotal axis of the common outer gimbal ring will communicate an equal angular movement about that axis to each of the other inner gimbal rings, by virtue of the presence of the common outer ring.

In a preferred embodiment of the invention two gyroscopes are used having normally parallel spinning axes and such an arrangement is particularly applicable to self-monitoring techniques such as a self-monitored attitude reference. This has become necessary since, in most modern autopilot control applications, the authority limitations imposed by torque limiter devices are insufficient to satisfy safety requirements over the whole flight regime, particularly in view of the more stringent safety requirements for lower minima operations.

Thus, according to another aspect of the invention, a self-monitored gyroscopic attitude reference system responsive to angular movements of a dirigible craft about a first and a second axis fixed with reference to the craft and at right-angles to one another, comprises a main and a monitoring gyrowheel each mounted for spinning in its own individual inner gimbal ring on a spinning axis normally at right-angles to both of said first and second axes and a common outer gimbal ring, each inner gimbal ring being pivotally mounted for angular movement about one of said first and second axes, the common outer gimbal ring being itself pivotally mounted for movement about the other of said first and second axes, means for generating output signals on the occurrence of an angular movement relative to the craft of either the common outer gimbal ring or the inner gimbal ring of the main wheel, means for generating a monitoring signal on the occurrence of a similar angular movement of the inner gimbal ring of the monitoring wheel, means for measuring the difference between the signal generated by the angular movement of the inner gimbal ring of the main wheel and the monitoring signal, and means for generating an alarm signal should such difference exceed a predetermined threshold value.

According to still another aspect of the invention, the main and the monitoring gyrowheels each have a first inner and a first outer gimbal ring pivotally mounted for angular movement about one of said first axes and a second inner gimbal ring pivotally mounted for movement about the other of said first and second axes, each of the first outer gimbal rings being pivotally mounted in a common second outer gimbal ring for angular movement about the one of said first and second axes, whilst the common second outer gimbal ring is itself pivotally mounted for angular movement about the other of said first and second axes. In the case of the main gyro, the first outer gimbal ring is servoed so as to follow up the first inner gimbal ring and the common second outer gimbal ring is servoed so as to follow up the second inner gimbal ring. The first outer gimbal ring of each gyro is linked so as to move together, the whole arrangement being such that output signals are generated on the occurrence of angular movement relative to the craft of either the linked first outer gimbal rings or of the common second outer gimbal ring, whilst discrepancies between the movement of the two gyro wheels cause alarm signals to be generated by angular movements of the first and second inner gimbal rings of the monitoring gyrowheel.

Preferably those gimbal rings which are servoed are positioned by electrical closed loop servosystems, there being two such systems each comprising a pickoff or synchro, an amplifier, a shaping filter and a servomotor. The two first outer gimbal rings are conveniently connected by means of a mechanical linkage or by a gear train.

The signal generating means are preferably electrical such as synchro generators and the said difference can then be measured by an electronic comparator which also generates the alarm signal. This latter signal can fulfill any required purpose such as disconnecting an autopilot or giving a visual signal to the pilot of the craft. The output signals can fulfill similar functions.

Such a self-monitored system can be cheaper, lighter and more reliable than other systems, and maintenance of all the systems fed from the gyroscopes or gyros can easily be carried out. Another advantage of great significance for aircraft is the ability to detect failures in a vertical reference before they give rise to an aerodynamic response. In fact, such failures can be detected which would cause a response too slow for detection by present techniques and this represents a significant contribution to the confidence which can be placed in lower minima automatic landing operations.

As presently used, "comparison" gyro techniques give adequate protection against such failures as are likely to give rise to high aircraft accelerations and attitude changes, otherwise known as "hard-over" failures. The self-monitored gyro scheme provides at least the same integrity of "hard-over" monitoring and in addition to the ability to monitor against the "slow-over" failures so important for automatic landing.

Figure 2:
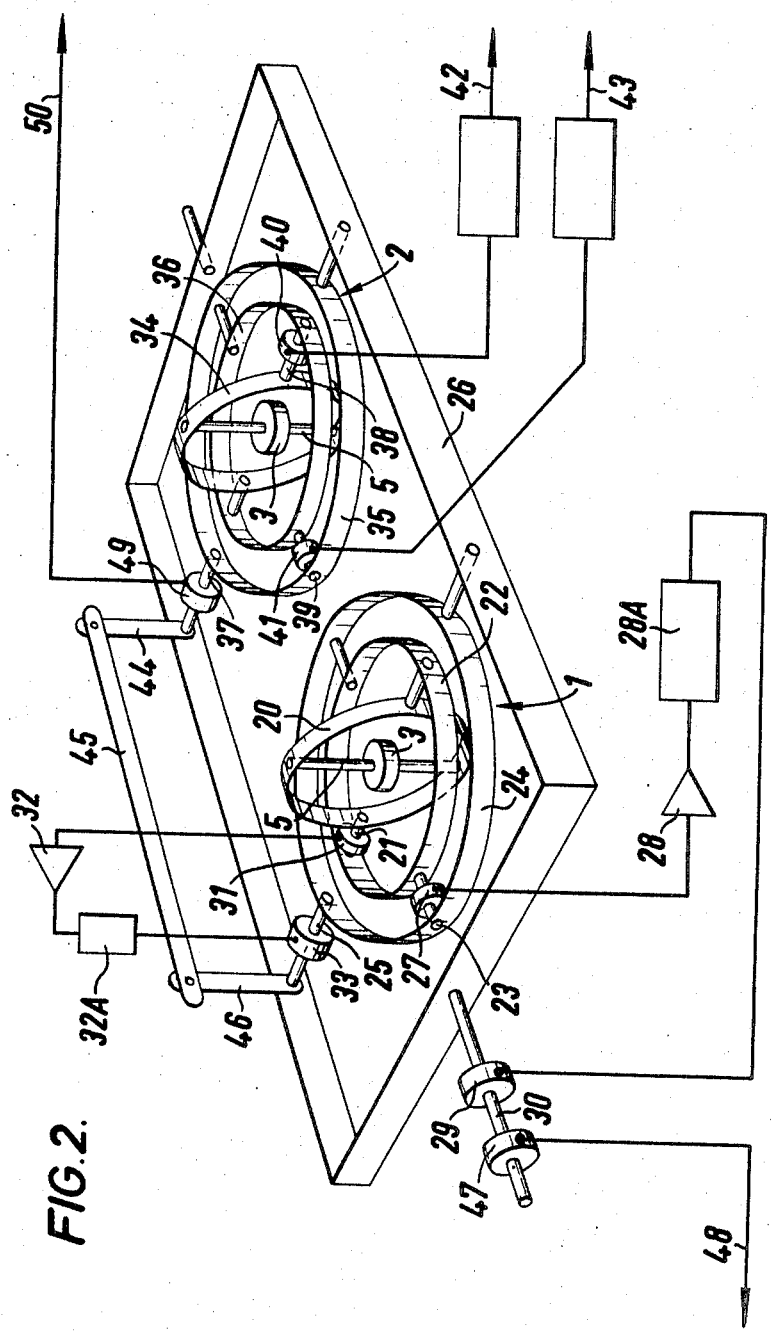

The invention will now be further described by way of example with reference to the accompanying drawings, in which:

FIGURE 1 is a diagrammatic view of the essential parts of a simple embodiment of the invention, using two gyros each having a notionally vertical spinning axis, both being mounted in a common outer roll gimbal; and FIGURE 2 is a similar view of a more refined embodiment of the same basic arrangement.

Referring first to FIGURE 1, a main or command vertical attitude reference gyro is generally indicated at 1 and a separate monitoring gyro is similarly indicated at 2. The gyro 1 has a wheel 3 spinning on a normally vertical shaft 5 in an inner or pitch gimbal ring.

The gyro 2 has similar reference numerals for similar parts. Each pitch gimbal ring 4 is pivoted at 6 and 7 respectively in an outer or roll gimbal ring 8, the pivots at 6 and 7 each carrying a synchro numbered 9 in the case of the main gyro 1 and 10 in the case of the monitoring gyro 2. The pitch output signal from the synchro 9 is fed into a comparator 11 and also to an autopilot or to a visual indicator by way of a line 12. The output signal from the synchro 10 is also fed into the comparator 11. Should the outputs of the two synchros differ by more than a predetermined threshold value, then the comparator initiates an alarm signal by way of a line 13.

The outer or roll gimbal ring 8 is carried on a shaft or pivot 14 pivoted for angular movement about the roll axis of the aircraft. It can be seen that the system is mechanically integral as far as the shaft 14 and in order to carry this integrity forward into the electrical sensing system, this shaft carries two synchros 15 and 16. The roll output signal from the synchro 15 is fed into a second comparator 17 and also, as before, to an autopilot or to a visual indicator, in this case by way of a line 18. The output signal from the synchro 16 is also fed into the comparator 17, which when called for issues an alarm signal by way of a line 19. The presence of the synchro 16 and the comparator 17 thus affords a fail-safe feature.

It is necessary for the operation of the system that the two gyros 1 and 2 should have suitably different characteristics. Suitable differences can be calculated from basic gyroscope theory acording to the threshold monitoring requirements in each axis and may be differences in either speed and possibly direction of rotation of the wheels or the wheels can have different moments of inertia about the axes of spin or pitch.

When all parts of the system are functioning correctly, the main gyro 1 will operate in the conventional manner.

Now assume that there is excessive friction in the roll pivot 14. Aircraft roll will now cause angular movement of the roll gimbal ring 8, which movement will in turn cause both gyrowheels to precess about their pitch pivots 6 and 7. The degree of precession will be different in each case due to the different characteristics of the two wheels and hence the synchros 9 and 10 will feed signals of differing strength into the comparator 11. If the difference is sufficiently great an alarm signal will be given.

Assume now that there is excessive friction in one or other of the pitch pivots 6 or 7. Aircraft pitch now results in angular movement of the inner gimbal ring 4 of the affected gyroscope, thus causing precession about the roll pivot 14. This angular movement of the roll gimbal ring in turn results in precession of the other wheel about its pitch pivot, thus again causing an alarm signal to be given.

The system shown in FIGURE 2 uses the same basic principle as is described above but has a more complicated arrangement of gimbal rings. The object of the extra complication is the reduction of friction so as to allow the greatest possible freedom of movement of the gyros relative to the aircraft.

As in FIGURE 1, the system has a main or command vertical attitude reference gyro and a separate monitoring gyro, generally indicated at 1 and 2 respectively. Each gyro has a wheel 3 spinning on a normally vertical shaft 5.

The shaft 5 of the main gyro 1 spins in an inner pitch gimbal ring 20, which ring is carried on a shaft 21 pivoted in an inner roll gimbal ring 22. The ring 22 is carried on a shaft 23 which in turn is pivoted in an outer pitch gimbal ring 24. The ring 24 is itself carried on a shaft 25 pivoted in an outer roll gimbal ring 26 which is common to both gyros 1 and 2. The shaft 23 carries a synchro 27 electrically connected through an amplifier 28 and a filter 28A to a servomotor 29 mounted on a pivoted shaft 30 attached to the outer ring 26. Thus a closed loop servo system is formed which ensures that the outer roll gimbal ring 26 follows the movements of the inner roll gimbal ring 22.

Similarly, the shaft 21 carries a synchro 31 electrically connected through an amplifier 32 to a further servomotor 33 mounted on the shaft 25. Thus a second closed loop servosystem causes the outer pitch gimbal ring 24 to follow the movements of the inner pitch gimbal ring 20.

Referring now to the monitoring gyro 2, this has inner and outer pitch gimbal rings 34 and 35 respectively and an inner roll gimbal ring 36, these rings being similarly arranged to the corresponding rings of the main gyro 1. The outer pitch gimbal ring 35 is carried on a shaft 37 pivoted in the common outer roll gimbal ring 26. The ring 34 is carried on a shaft 38 pivoted in the ring 36, which ring is itself carried on a shaft 39 pivoted in the ring 35. The shafts 38 and 39 carry synchros 40 and 41 respectively, these synchros generating alarm signals under fault conditions. These signals are fed out by way of lines 42 and 43. The shafts 25 and 37 are interconnected by a linkage 44, 45 and 46 so that the two outer gimbal rings 24 and 35 are constrained to move in unison.

The shaft 30 carries a further synchro 47 which generates a roll output signal, fed by way of a line 48 to an autopilot or visual indicator. Likewise, a synchro 49 mounted on the shaft 37 generates a pitch output signal fed into a line 50.

As in the embodiment of FIGURE 1, the main gyro 1 will generate roll and pitch output signals in the conventional manner when the system is functioning correctly.

When considering fault conditions, it will be recalled that, referring to the main gyro 1, the inner and outer pitch gimbal rings 20 and 24 are servoed together, as are the inner and outer roll gimbal rings 22 and 26. Referring to both gyros, the outer roll gimbal ring 26 is common to both whilst the two outer pitch gimbal rings are mechanically linked. Thus, only the inner pitch and the inner roll gimbal rings 34 and 36 respectively, of the monitoring gyro 2, are free to move independently. When a fault occurs in the system, such movement will take place and an alarm signal or signals will be generated by either or both of the synchros 40 and 41.

It will be appreciated that the advantage of this system of gimbal rings is to give the gyrowheels the minimum possible amount of frictional resistance to movement, such friction being independent of the output load taken off from the shafts 30 and 37.

This description is mainly directed to the usual orientation of the system, that is to say with the axes of the gyrowheels being normally vertical and the system being responsive to angular movements of the craft about the conventional pitch and roll axes. This, however, only applies to preferred embodiments and the system is equally viable when applied to any three orthogonal axes. It will be appreciated that in normal operation the movements of the gimbal rings are described strictly relative to each other and to the craft. In the case of aircraft, relative to the inertial space reference the aircraft rotations are measured relative to the gyrowheels, which are therefore required to provide a fixed reference.

I claim:
1. A gyroscopic system arranged as a self-monitored gyroscopic attitude reference system responsive to angular movements of a dirigible craft about a first and a second axis fixed with reference to said craft and at right-angles to one another, comprising a main gyrowheel and a monitoring gyrowheel, two individual inner gimbal rings in each of which is mounted for spinning one of said gyrowheels on a spinning axis normally at right-angles to both of said first and second axes, a common outer gimbal ring in which are pivotally mounted both of said individual inner gimbal rings for angular movement about one of said first and second axes, a pivotal mounting for angular movement of said common outer gimbal ring about the other of said first and second axes, means for generating output signals on the occurrence of an angular movement relative to said craft of said common outer gimbal ring, means for generating output signals on the occurrence of an angular movement relative to said craft of that inner gimbal ring in which spins said main gyrowheel, means for generating a monitoring signal on the occurrence of an angular movement relative to said craft of that inner gimbal ring in which spins said monitoring gyrowheel, means for measuring the difference between said signals generated by said angular movement of said inner gimbal ring of said main gyrowheel and said monitoring signal, and means for generating an alarm signal should said difference exceed a predetermined threshold value.

2. A gyroscopic system arranged as a self-monitored gyroscopic attitude reference system responsive to angular movements of a dirigible craft about a first and a second axis fixed with reference to said craft and at right-angles to one another, comprising a main gyrowheel and a monitoring gyrowheel, two individual first inner gimbal rings in each of which is mounted for spinning one of said gyrowheels on a spinning axis normally at right-angles to both of said first and second axes and each having two individual first outer gimbal rings, said first inner and said first outer gimbal rings being pivotally mounted for angular movement about one of said first and second axes, two individual second inner gimbal rings, one for each of said gyrowheels and each pivotally mounted for angular movement about the other of said first and second axes, a common second outer gimbal ring in which is pivotally mounted each of said first outer gimbal rings for angular movement about one of said first and second axes, and a pivotal mounting for angular movement of said common second outer gimbal ring about the other of said first and second axes, said first outer gimbal ring of said main gyrowheel being servoed so as to follow up said first inner gimbal ring of said main gyrowheel and in which said common second outer gimbal ring is servoed so as to follow up said second inner gimbal ring, said first outer gimbal rings of both said main gyrowheel and said monitoring gyrowheel being linked so as to move together, the whole arrangement being such that output signals are generated on the occurrence of angular movement relative to said craft of said linked first outer gimbal rings and also on the occurrence of angular movement relative to said craft of said common second outer gimbal ring, while discrepancies between the movements of said main gyrowheel and of said monitoring gyrowheel cause alarm signals to be generated by angular movements of said first and of said second inner gimbal rings of said monitoring gyrowheel relative to said outer gimbal rings should such discrepancies exceed the predetermined threshold value.

3. A gyroscopic system according to claim 2 in which said servoed gimbal rings are positioned by electrical closed loop servo systems, there being two of said systems each comprising a synchro pick-off, an amplifier a shaping filter and a servomotor.

4. A gyroscopic system according to claim 3 in which said first outer gimbal rings are linked by mechanical means.

5. A gyroscopic system according to claim 4 in which said signal generating means are synchro generators and in which siad discrepancies between said signals are measured by electronic comparators which beyond said predetermined threshold values generate said alarm signals.

References Cited

UNITED STATES PATENTS

| 2,631,455 | 3/1953 | Wing | 74—5.34 |
| 2,969,681 | 1/1961 | Beasley | 74—5.34 XR |
| 3,158,340 | 11/1964 | Sellers | 74—5.34 XR |
| 3,214,983 | 11/1965 | Dozier | 74—5.34 |
| 3,323,380 | 6/1967 | Bosch et al. | 74—5.34 |
| 3,304,788 | 2/1967 | Grangvist | 74—5.4 |

FOREIGN PATENTS

| 436,190 | 1/1912 | France. |

FRED C. MATTERN, JR., *Primary Examiner.*

MANUEL ANTONAKAS, *Assistant Examiner.*